United States Patent [19]
Sokolow

[11] 3,942,774
[45] Mar. 9, 1976

[54] METHOD OF AND MEANS FOR EFFECTING REDISTRIBUTIVE MIXING IN AN EXTRUDER

[75] Inventor: Nickolas N. Sokolow, Cheshire, Mass.

[73] Assignee: Beloit Corporation, Beloit, Wis.

[22] Filed: Feb. 28, 1975

[21] Appl. No.: 553,979

[52] U.S. Cl. .............................................. 259/191
[51] Int. Cl.² .......................................... B29B 1/06
[58] Field of Search ......... 259/191, 192, 193, 9, 10, 259/97, 25, 26, 45, 46; 425/202, 207, 208, 209, 204, 206

[56] References Cited
UNITED STATES PATENTS

| | | | |
|---|---|---|---|
| 3,045,283 | 7/1962 | Keiser | 259/191 |
| 3,131,433 | 5/1964 | Volland | 259/191 |
| 3,486,192 | 12/1969 | Roy | 425/202 |
| 3,555,616 | 1/1971 | Parks | 425/209 |
| 3,865,354 | 2/1975 | Burpulis et al. | 259/191 |

Primary Examiner—Robert W. Jenkins
Attorney, Agent, or Firm—Hill, Gross, Simpson, Van Santen, Steadman, Chiara & Simpson

[57] ABSTRACT

Redistributive mixing is effected in an extruder wherein the extruder screw advances thermoplastic material toward and through transfer grooves in a co-rotative torpedo. The torpedo grooves progressively diminish in cross sectional flow area from inlet ends at the upstream end of the torpedo toward downstream ends running out adjacent to the torpedo tip. Feeder grooves in a complementary passage wall of a stationary discharge head adapter in which the torpedo operates, receive the thermoplastic material transferred and propelled with redistributive mixing action from the torpedo grooves. The passage wall grooves have upstream entry ends aligned with the upstream ends of the torpedo grooves and extend therefrom in progressively increasing cross sectional flow area to downstream ends feeding toward an outlet.

18 Claims, 9 Drawing Figures

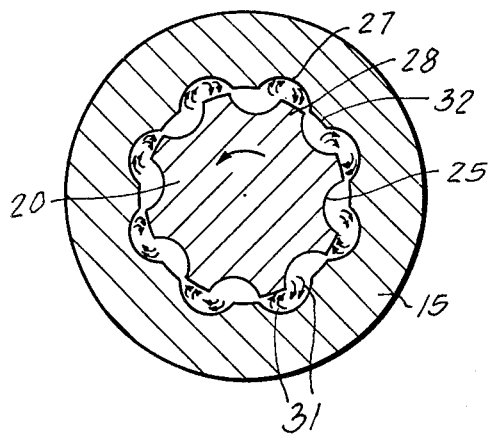
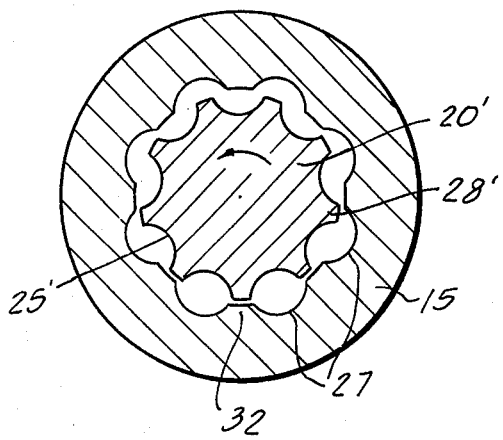
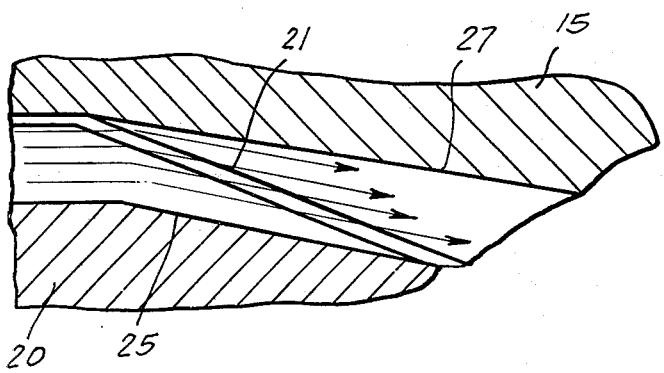
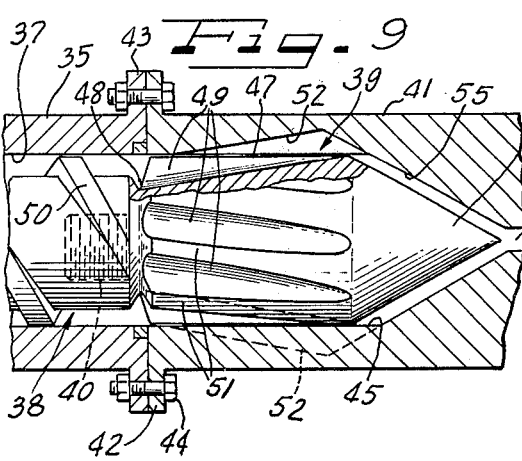
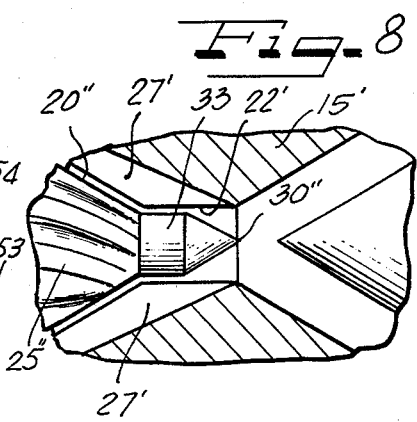

METHOD OF AND MEANS FOR EFFECTING REDISTRIBUTIVE MIXING IN AN EXTRUDER

BACKGROUND OF THE INVENTION

This invention relates to improvements in the extrusion of synthetic thermoplastic polymer melt, and is more particularly concerned with a new and improved method of and means for effecting redistributive mixing in an extruder.

A well-known problem in the extrusion of resinous thermoplastic materials is in the attainment of satisfactorily uniform melt and mixing of the particles or granules supplied to the extruder. In a common form, such extruders comprise a hollow barrel within which the plastic material is heated for fluxing and a helical screw mixes and advances the material toward an outlet such as an extrusion die or nozzle. Some particles, and particularly high-molecular weight particles, frequently resist melting while propelled through the heated passage within the extruder, and therefore various expedients have heretofore been employed to improve melt quality and mixing, including variously constructed mixing sections which may be of the barrier type. U.S. Pat. No. 3,486,192 is one example of such an arrangement. On the other hand, various disperision mixing devices have been proposed which comprise mechanical means for breaking up particles and randomly mixing them by agitation such as churning, shaking, tumbling, tossing and the like. U.S. Pat. Nos. 3,045,283 and 3,555,616 belong in this category. Proposal has also been made to provide an equalizing head arrangement with a fluted torpedo, and U.S. Pat. No. 3,782,692 is referred to as an example of such a structure.

However, various prior attempts at solving the problem have not been as efficient as hoped for, often have required excessive energy consumption, and in general have been expensive expedients.

SUMMARY OF THE INVENTION

It is therefore a principal object of the present invention to overcome the foregoing and other problems by the provision of a new and improved method of and means for effecting redistributive mixing in an extruder of the helical screw type and enhancing the product quality and performance in plastic extrusion.

According to features of the invention, there is provided a new and improved method of and means for effecting redistributive mixing in an extruder including a barrel within which a helical extruder screw rotates to advance thermoplastic material toward a corotative torpedo of generally conical form within a complementary tapered wall which defines a passage in a stationary discharge head at the downstream end of the barrel and leads into a small diameter orifice outlet, grooves in the torpedo having inlet ends at the maximum diameter of the torpedo receptive of thermoplastic material advanced thereinto and therealong by the screw, the torpedo grooves progressively diminishing in cross sectional flow area toward downstream ends running out adjacent to the outlet, grooves in the tapered passage wall to which the thermoplastic material is progressively transferred and propelled with redistributive mixing effect from the torpedo grooves. The passage wall grooves have minimum cross sectional flow area upstream ends adjacent to the maximum cross sectional flow area ends of the torpedo grooves and extend therefrom in progressively increasing cross sectional flow area to downstream ends feeding toward the outlet.

Other objects, features and advantages of the invention will be readily apparent from the following description of certain preferred embodiments thereof, taken in conjunction with the accompanying drawings although variations and modifications may be effected without departing from the spirit and scope of the novel concepts embodied in the disclosure, and in which:

BRIEF DESCRIPTION OF THE DRAWINGS

FIG. 4 is a view similar to FIG. 3 but demonstrating redistributive action of the components in operation;

FIG. 6 is an enlarged fragmentary sectional detail view taken substantially along the line VI—VI of FIG. 3;

FIG. 7 is a transverse sectional detail view similar to FIG. 6 but showing a modification;

FIG. 8 is a fragmentary longitudinal sectional elevational view similar to FIG. 1 but showing another modification; and FIG. 9 is a fragmentary longitudinal sectional elevational view showing a further modification.

DETAILED DESCRIPTION OF THE PREFERRED EMBODIMENTS

Figure 1:
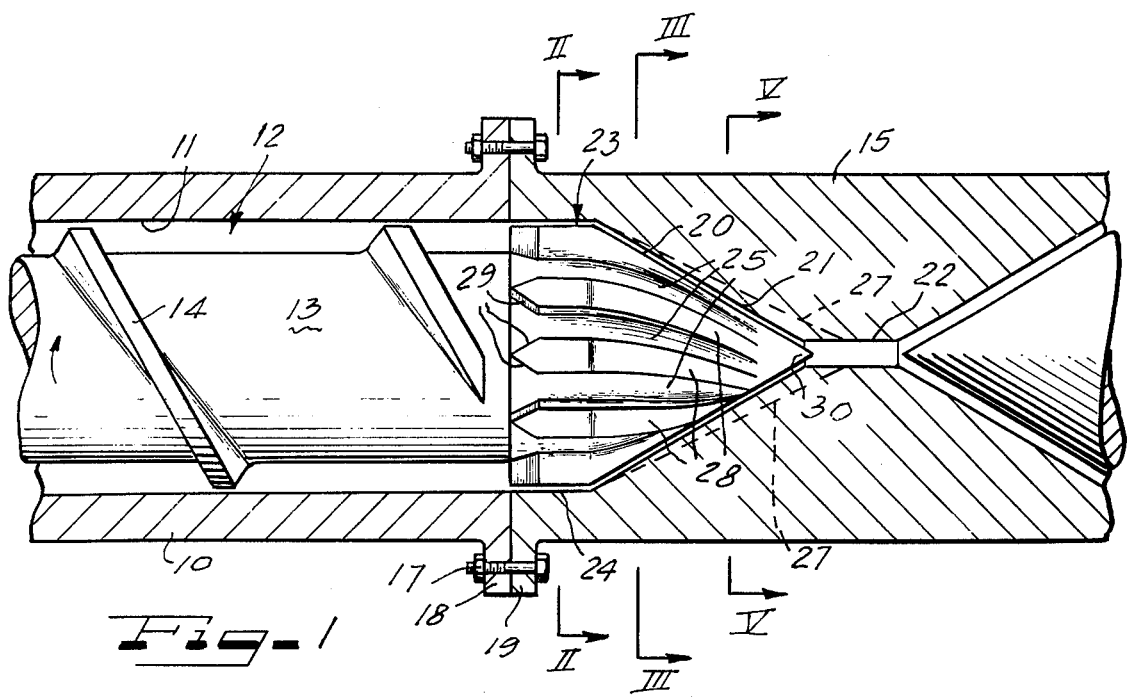
FIG. 1 is a fragmentary longitudinal section elevational view showing a representative form of extruder embodying features of the invention.
Figures 2, 3:
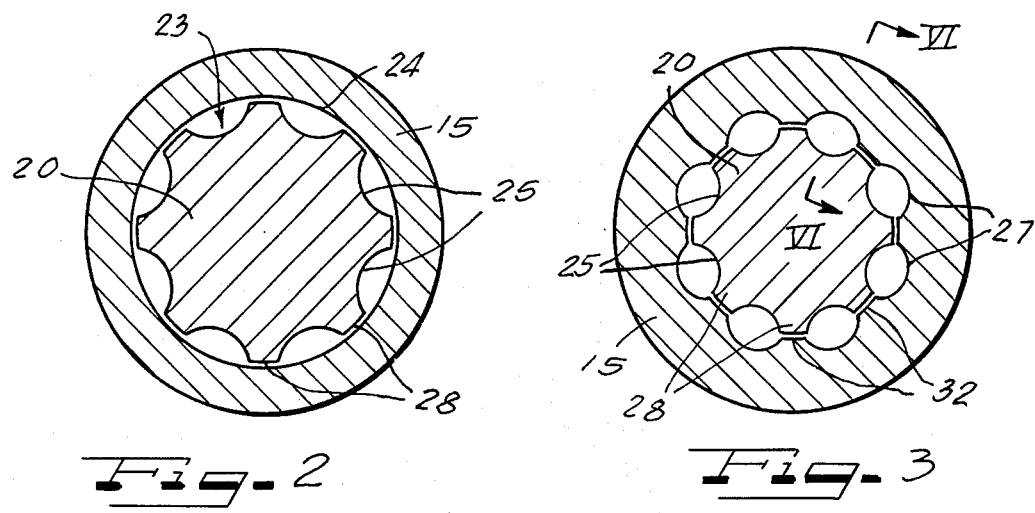
FIG. 2 is a transverse sectional detail view taken substantially along the line II—II of FIG. 1.
FIG. 3 is a transverse sectional detail view taken substantially along the line III—III of FIG. 1.
Figure 5:
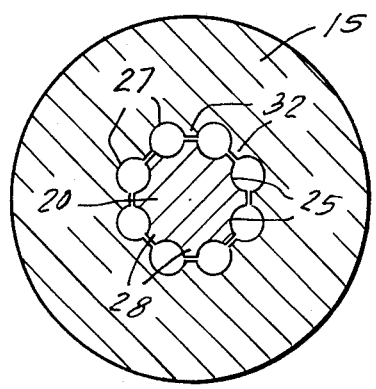
FIG. 5 is a transverse sectional detail view taken substantially along the line V—V of FIG. 1.

On reference to FIG. 1, a typical extruder such as may be employed for injecting thermoplastic material, sometimes referred to as synthetic thermoplastic polymer melt, into an injection molding machine, includes a hollow tubular barrel 10 having therein a cylindrical inner wall 11 within which a helical extruder screw 12 rotates about the axis of its rod or shank 13 carrying one or more radially projecting continuous helical screw threads or flights 14 functioning as the screw rotates, as indicated by the directional arrow, to advance thermoplastic material from an upstream point in the working chamber 11 of the barrel downstream toward an adaptor or head 15 which may be part of or associated with a molding machine or extrusion die apparatus. Detachable mounting of the head 15 in stationary relation onto the downstream end of the barrel 10 may be effected by means of screws of bolts 17 securing together lateral attachment flanges 18 and 19 on respectively the barrel and the head.

In the operative rotation of the screw 12, thermoplastic material is advanced through the barrel 10 toward a corotative torpedo 20 of generally conical form within a complementary tapered wall 21 defining a passage in the discharge head 15 communicating with the downstream end of the barrel 10 and leading into a suitably small diameter orifice outlet 22. Although the torpedo 20 may be constructed as a one-piece integral part of the screw shank 13, it may be, for convenience in manufacture, made as a separate part fixedly, corotatively concentrically attached to the end of the shank 13 to function as an integral terminal part of the screw 12. In a preferred form, the torpedo 20 has a relatively short butt end portion 23 which is cylindrical and of substantially the same diameter as the screw flight 14, and similarly as the outer diameter of the screw flight 14 closely approaches the barrel chamber wall 11. The butt portion 23 is of a diameter which closely approaches the diameter of a complementary cylindrical lead-in portion 24 of the passage 21, and with the remainder of the torpedo 20 and of the wall of the passage 21 of complementary conically tapered form and with the conical surface of the torpedo closely approaching the conical wall.

According to the present invention, superior, positive redistributive mixing of the thermoplastic material is effected by means of a system of thermoplastic material transfer grooves 25 in the torpedo 20 (FIGS. 1–6) and cooperative feeder grooves 27 in the passage wall 21.

Separating the grooves 25 in the torpedo 20 are generally longitudinally extending substantially narrower ribs 28 which are suitably tapered at their upstream ends as shown at 29 (FIG. 1) to provide lead-in throats into inlet ends at the maximum diameter of the torpedo 20 and receptive of thermoplastic material advanced thereinto and along the grooves 25 by action of the extruder screw 12. Each of the grooves 25 is of maximum cross sectional flow area at its inlet end and progressively diminishes in cross sectional flow area toward its downstream end, running out adjacent to the outlet 22. More particularly, the torpedo 20 terminates in a coaxial tip extremity point 30 which projects into the upstream or entry end of the outlet 22. The grooves 25 preferably diminish in cross sectional flow area toward and run out to preferably zero cross sectional flow area at the tip end portion of the torpedo and short of the point 30 so that there is a limited conical ungrooved terminal portion of the torpedo between the run-out ends of the grooves 25 and the point 30. This assures that the thermoplastic material advanced or propelled to and through the grooves 25 must transfer to the head passage grooves 27.

Toward attainment of the new and improved redistributive mixing provided by the present invention, the construction of the head passage grooves 27 and their relationship to the torpedo grooves 25 is such that as nearly as practicable all of the thermoplastic material forced into and through the torpedo grooves 25 must transfer to and move on from the torpedo to the outlet 22 through the grooves 27 with maximum mixing effect and without increasing load on the extruder screw 12 beyond that which would be normal for a conventional fluted torpedo arrangement. To the attainment of these advantageous results, the grooves 27 are of progressively increasing cross sectional flow area from their upstream ends adjacent to the maximum diameter of the passage wall 21, and thus also at the maximum diameter of the torpedo 20, to downstream ends feeding into the outlet 22, substantially as shown. Throughout their lengths which are coextensive with the grooves 25, the grooves 27 progressively increase in cross sectional flow area substantially proportionate to the decrease in cross sectional flow area of the grooves 25. Beyond the downstream ends of the grooves 25, the grooves 27 may continue to increase in cross sectional flow area to their downstream ends which feed into the outlet 22. Transfer relationship of the grooves 25 to the grooves 27 and the relative cross sectional flow areas are exemplified in FIGS. 3, 5 and 6. In FIG. 6 the directional arrows represent transfer flow of the plastic material from the grooves 25 into the grooves 27 and demonstrate unimpeded axial flow to and between and through the groove systems.

While promoting axial flow of the thermoplastic material by transfer of the material from the groove system 25 of the torpedo into and through the groove system provided by the grooves 27 of the head 15, relative rotary movement of the torpedo 20 causes the transfer to be effected by progressive increments from each of the grooves 25 of the torpedo successively into each of the grooves 27 of the discharge head 15. Thereby, concomitant with advancing, feeding movement of the thermoplastic material through the groove system, there is a lateral churning, twisting, mixing, blending action and movement as exemplified in FIG. 4 by directional arrows 31. This results from the slicing-off, layering, shredding action of the torpedo ribs 28 sweeping laterally across the discharge head grooves 27, and the concomitant lateral movement of the torpedo grooves 25 laterally past the successive ribs, identified at 32, of the chamber wall 21 dividing the respective grooves 27 one from the other. Inasmuch as the crowns of the ribs 28 and 32 closely approach one another as the ribs 28 pass the ribs 32 in each revolution of the torpedo 20, it will be appreciated that in addition to the slicing off and rolling action imparted to the thermoplastic material as the ribs sweep across the grooves, there is a shearing action on the thermoplastic material as each of the torpedo ribs 28 passes each of the discharge head ribs 32. The efficiency of this action will be appreciated when it is considered that in each revolution of the torpedo 20 the mixing and shearing action is multiplied by the number of the grooves 25 multiplied by the number of the grooves 27, multiplied by the revolutions per minute. For example, where the torpedo rotates at 100 r.p.m. and there are 8 grooves in each set, the number of mixing actions and shearing actions will be $$8 \times 8 \times 100 = 6400.$$

It will thus be apparent that by the time any particle of the thermoplastic material has traveled through the length of the groove systems it will have been redistributively mixed an exceedingly large number of times with the companion particles of the thermoplastic material, thereby attaining a very thorough, uniformly blended thermoplastic material stream in the outlet 22. Once the thoroughly mixed individual streams from each of the grooves 27 is delivered to and recombined in the outlet 22, the material undergoes additional and final mixing due to the localized high shear in the orifice of the outlet 22.

Means are provided to avoid cyclical shock and vibration in the high speed running passing of the grooves 25 and their separating ribs 28 past the grooves 27 and their separating ribs 32. One such means comprises having the torpedo grooves 25 formed on a slight helix, as best seen in FIG. 1, extending in generally the same direction as the helix of the screw flight or flights 14. This is especially effective where the number of the grooves 25 and 27 is identical, providing a slicing instead of chopping action.

Another means for avoiding operating shock and vibration is to provide differential number of grooves and separating ribs in each set. For example, as shown in FIG. 7, the torpedo 20' may be provided with one groove 25' and one rib 28' more than the grooves 27 and ribs 32 of the head 15. For example, where there are eight of the grooves 27 and ribs 32, there may be nine of the grooves 25' and ribs 28'. Therefore, at no time can all of the grooves 25' coincide with all of the grooves 27 nor can at any one time all of the ribs 28' coincide with all of the ribs 32. Further, the width of the grooves 25' may be less than the corresponding width of the grooves 27, and the widths of the ribs 28' may differ from, that is be narrower than the width of the ribs 32.

Where it is desired to attain additional shearing, mixing effect in the outlet orifice toward which the torpedo feeds in the discharge head, the arrangement depicted in FIG. 8 may be employed. Therein, the torpedo 20" has a cylindrical extension 33 between its conical ungrooved tip extremity, the extension being of a diameter to be received fairly closely within the outlet 22' in the head 15'. In this arrangement, the head grooves 27' extend at their delivery ends preferably throughout the length of the orifice passage in the outlet 22'. The cylindrical extension 33 extends to a point about midway the length of the outlet 33' and with the conical terminal portion of the torpedo extending the remainder of the length of the outlet 22', with point 30" at the discharge end of the outlet. Thereby, thermoplastic material advanced and transferred from the grooves 25" into the grooves 27' is caused to pass through a high shear area where the individual streams from the grooves 27" are delivered into the outlet orifice 22' toward the extension 33 and the tapered tip of the torpedo. Thereby additional mixing of the plastic material is effected before it discharges from the outlet 22'.

In another desirable form, as shown in FIG. 9, an extruder barrel 35 has therein a cylindrical chamber 37 within which a helical extruder screw 38 is rotatably driven to advance thermoplastic material toward a corotative torpedo 39 which may be coaxially secured to the end of the screw 38 as by means of a threaded coupling 40. Housing the torpedo 39 is a stationary discharge head 41 coupled by means of a collar flange 42 thereon to a matching collar flange 43 on the end of the barrel 35 through the medium of bolts 44. In this instance, the torpedo 39 is of generally cylindrical shape and the adapter head 41 has a chamber wall 45 therein which is of cylindrical form throughout its major length of preferably the same diameter as the diameter of the barrel chamber 37, with the torpedo 39 having a cylindrical portion 47 of complementary cylindrical form and of almost the same length as the cylindrical portion of the passage 45. Adjacent juncture with the extruder screw 38, the torpedo 39 has a narrow annular groove 48 providing a dropoff into the inlet ends of a circumferential series of plastic transfer grooves 49 which are of maximum cross sectional flow area at their inlet ends to receive the plastic material advanced by helical impeller vane means 50 of the screw. From their inlet ends, the grooves extend in a slightly helical direction and progressively diminish in cross sectional flow area toward downstream ends running out at the downstream end of the cylindrical section 47 of the torpedo. Intervening between the grooves 49 are respective ribs 51 which are substantially narrower at the inlet ends of the grooves and become progressively wider toward the run-out ends of the grooves. Conversely, the cylindrical portion of the adapter head passage 45 has therein feeder grooves 52 extending from upstream ends adjacent to the maximum cross sectional flow areas of the torpedo grooves 49 and progressively increasing in cross sectional flow area to downstream ends substantially coinciding with the downstream ends of the grooves 49 and running out into a conical portion 55 of the head passage leading to a small diameter orifice outlet 53. It will be observed that the torpedo 39 downstream from the run-out ends of the transfer grooves 49 has a conical tip 54 complementary in narrowly spaced relation to the passage wall portion 55, whereby the individual streams of redistributively mixed thermoplastic material run together and are extruded with continuous shearing action toward and through the orifice 53.

From the foregoing it will be apparent that the present invention provides for simple, economical, efficient positive redistributive mixing of thermoplastic material in an extruder. After leaving the extruder screw, laminar flow of the thermoplastic material is avoided in the adapter or discharge head by the unique cooperative functioning of the progressively diminishing cross sectional flow area transfer grooves in the perimeter of the tapered torpedo which extends from the extruder screw and the progressively increasing cross sectional flow area feeder grooves in the discharge head passage wall. As the thermoplastic material is transferred from the torpedo grooves into the discharge head feeder grooves, rotation of the torpedo effects a peeling off of the transferred material in thin layers, the thickness of which will depend on the speed of flow of the material and the relative widths of the grooves. Within the several grooves in the wall of the discharge head passage the peeled or sliced off layers of shredded particles of the thermoplastic material are mixed by blending of the shavings or layers of thermoplastic material during the churning, twisting of each sub-stream in each of the discharge head grooves about their respective axes to their confluence downstream in the discharge head passage for extrusion from the outlet orifice.

It will be understood that variations and modifications may be effected without departing from the spirit and scope of the novel concepts of this invention.

I claim as my invention:

1. Means for effecting redistributive mixing in an extruder including a barrel within which a helical extruder screw rotates to advance thermoplastic material toward a corotative torpedo having a downstream end portion and operating within a generally complementary wall defining a passage in a stationary discharge head at the downstream end of the barrel and leading into a small diameter orifice outlet, the improvement comprising:

transfer grooves in said torpedo having inlet ends at the upstream end of the torpedo receptive of thermoplastic material advanced thereinto and therealong by the screw;

said torpedo grooves progressively diminishing in cross sectional flow area from their inlet ends to downstream ends running out toward said downstream end portion of the torpedo;

feeder grooves in the passage wall to which the thermoplastic material is progressively transferred and propelled from the torpedo grooves; and said feeder grooves having upstream ends adjacent to the inlet ends of the torpedo grooves and extending therefrom in progressively increasing cross sectional flow area to downstream ends adjacent to said downstream ends of the torpedo grooves from which the plastic material advances to said outlet.

2. Means according to claim 1, wherein the depth of the torpedo grooves progressively diminishes substantially proportionate to progressive increase in depth of the passage wall grooves, whereby to provide for the progressively diminishing cross sectional flow area of the torpedo grooves and the corresponding progressively increasing cross sectional flow area of the passage wall grooves.

3. Means according to claim 1, wherein said downstream end portion of the torpedo comprises a conical tip running out at a terminal point and said grooves run out on the conical tip, with a substantial ungrooved conical terminal area of the torpedo intervening between said terminal point and the runout ends of the torpedo grooves.

4. Means according to claim 3, wherein said torpedo tip terminal point is located in the upstream end of the outlet.

5. Means according to claim 3, wherein said tip terminal point is located at the downstream end of the outlet.

6. Means according to claim 3, wherein said outlet is cylindrical, and said torpedo has a cylindrical portion between said tip terminal point and the remainder of the torpedo tip, and said cylindrical portion and said tip terminal point being located within the outlet.

7. Means according to claim 1, wherein the grooves in the torpedo are separated by intervening ribs, and the passage wall grooves are separated by intervening ribs, said ribs closely approaching one another so that in the relative rotation of the torpedo and the discharge head the thermoplastic material being advanced through the grooves is subjected to multiple shearing and churning mixing actions.

8. Means according to claim 1, wherein the grooves in the torpedo are slightly helical to eliminate vibration in passing the passage wall grooves in the relative rotation of the torpedo and the discharge head.

9. Means according to claim 1, wherein the number of grooves in the torpedo is differential relative to the number of grooves in said passage wall, to avoid vibration in high speed relative rotation of the torpedo and the discharge head.

10. Means according to claim 1, wherein the torpedo has its upstream end of substantially the same diameter as the helical screw, and said grooves in the torpedo have their inlet ends provided with lead-in throats opening toward the extruder screw.

11. Means according to claim 1, wherein the downstream ends of the passage wall grooves discharge longitudinally and radially into the outlet.

12. Means according to claim 1, wherein said torpedo and said passage wall are cylindrical throughout the major extent of the torpedo, and said transfer grooves are in the cylindrical portion of the torpedo and the feeder grooves are in the cylindrical portion of the passage wall.

13. Means according to claim 12, wherein said torpedo end portion is conical, said transfer grooves running out adjacent to juncture of the cylindrical and conical portions of the torpedo, and said downstream ends of the feeder grooves running into a conical portion of said passage wall generally complementary to the conical end portion of the torpedo.

14. A method of effecting redistributive mixing in an extruder having a barrel within which a helical extruder screw rotates to advance thermoplastic material toward a corotative torpedo within a complementary wall which defines a passage in a stationary discharge head at the downstream end of the barrel, the passage leading into a smaller diameter orifice outlet, the steps comprising:
receiving thermoplastic material advanced by the extruder screw in transfer grooves in the torpedo having inlet ends at the upstream end of the torpedo and progressively diminishing in cross sectional flow area to downstream ends running out toward the downstream end of the torpedo;
advancing the thermoplastic material downstream along the torpedo grooves;
progressively transferring the thermoplastic material from the torpedo grooves and propelling the thermoplastic material along grooves in the passage wall having their upstream ends adjacent to the upstream ends of said torpedo grooves and extending therefrom in progressively increasing cross sectional flow area to downstream ends adjacent to the downstream ends of the torpedo grooves; and
advancing the thermoplastic material from the downstream ends of the passage wall grooves to said outlet.

15. A method according to claim 14, including subjecting the thermoplastic material to multiple shearing and churning mixing during transfer to and advancing of the thermoplastic material along the passage wall grooves.

16. A method according to claim 14, including subjecting the thermoplastic material to high shear mixing in the outlet.

17. A method according to claim 14, including feeding the thermoplastic material from the downstream ends of the passage wall grooves in a longitudinal and radial converging relation into the outlet.

18. A method according to claim 14, including subjecting the thermoplastic material to further shearing mixing action in the outlet by action of the torpedo.

* * * * *